US006899196B2

(12) United States Patent
Husain et al.

(10) Patent No.: US 6,899,196 B2
(45) Date of Patent: May 31, 2005

(54) DRIVER INTERFACE SYSTEM FOR STEER-BY-WIRE SYSTEM

(75) Inventors: Muqtada Husain, Brownstown, MI (US); John G. Oynoian, Taylor, MI (US); Joseph A. Platz, Dearborn, MI (US); Brian E. Daugherty, Ann Arbor, MI (US); Robert T. Palmer, Ferndale, MI (US); John R. Balint, III, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/687,383

(22) Filed: Oct. 16, 2003

(65) Prior Publication Data

US 2005/0082107 A1 Apr. 21, 2005

(51) Int. Cl.$^7$ .............................................. B62D 5/06
(52) U.S. Cl. .................................... 180/402; 180/446
(58) Field of Search .............................. 180/402, 403; 701/41, 42

(56) References Cited

U.S. PATENT DOCUMENTS

| | | | |
|---|---|---|---|
| 3,580,352 A | | 5/1971 | Hestad |
| 4,558,759 A | | 12/1985 | Baatrup et al. |
| 4,825,972 A | * | 5/1989 | Shimizu .................... 180/444 |
| 4,940,105 A | | 7/1990 | Matsunaga et al. |
| 5,097,917 A | * | 3/1992 | Serizawa et al. ........... 180/402 |
| 5,247,441 A | | 9/1993 | Serizawa et al. |
| 5,347,458 A | | 9/1994 | Serizawa et al. |
| 5,908,457 A | | 6/1999 | Higashira et al. |
| 6,138,788 A | | 10/2000 | Bohner et al. |
| 6,213,248 B1 | * | 4/2001 | Kawaguchi et al. ........ 180/446 |
| 6,244,371 B1 | | 6/2001 | Bohner et al. |
| 6,269,903 B1 | | 8/2001 | Bohner et al. |
| 6,283,243 B1 | | 9/2001 | Bohner et al. |
| 6,336,519 B1 | | 1/2002 | Bohner et al. |
| 6,370,460 B1 | * | 4/2002 | Kaufmann et al. ........... 701/41 |
| 6,389,343 B1 | * | 5/2002 | Hefner et al. ................. 701/41 |
| 6,408,235 B1 | | 6/2002 | Tanke, II et al. |
| 6,422,335 B1 | * | 7/2002 | Miller ........................ 180/446 |
| 6,481,526 B1 | | 11/2002 | Millsap et al. |

(Continued)

OTHER PUBLICATIONS

MRB-2107-3 Product Bulletin from Lord Corporation (webpage, date not available).

*Primary Examiner*—Lesley D. Morris
*Assistant Examiner*—L. Lum
(74) *Attorney, Agent, or Firm*—Brinks Hofer Gilson & Lione

(57) ABSTRACT

A steer-by-wire system for an automotive vehicle comprises a driver interface system that includes a steering wheel mounted on a steering column. A reaction torque generator is coupled to the steering column for applying a resistive torque in response to a steering command to create a steering feel. An electromechanical brake, such as a magnetorehological brake, is also coupled to the steering column. During operation, a controller receives an input signal indicative of road wheel response to a steering command and determines when the road wheels have reached a limit, such as by engaging mechanical stops mounted on the vehicle or prevented from movement by curb or other external obstacle. In response, the controller actuates the electromechanical device to prevent rotation of the steering wheel and thereby alert the driver that the road wheels have reached a limit.

16 Claims, 2 Drawing Sheets

U.S. PATENT DOCUMENTS

| | | |
|---|---|---|
| 6,484,838 B1 * | 11/2002 | B.o slashed.rsting et al. .................... 180/402 |
| 6,505,703 B2 * | 1/2003 | Stout et al. ................ 180/446 |
| 6,523,637 B1 * | 2/2003 | Nakano et al. ............. 180/402 |
| 6,550,565 B2 * | 4/2003 | Thomas et al. ............. 180/402 |
| 6,575,263 B2 * | 6/2003 | Hjelsand et al. ........... 180/402 |
| 6,578,444 B1 | 6/2003 | Wendelin |
| 6,598,695 B1 * | 7/2003 | Menjak et al. ............. 180/402 |
| 6,609,052 B2 * | 8/2003 | Radamis et al. ............. 701/41 |
| 6,612,392 B2 * | 9/2003 | Park et al. .................. 180/402 |
| 6,659,218 B2 * | 12/2003 | Thomas et al. ............. 180/402 |
| 6,799,654 B2 * | 10/2004 | Menjak et al. ............. 180/402 |
| 2001/0032749 A1 | 10/2001 | Thomas et al. |
| 2002/0059021 A1 | 5/2002 | Nishizaki et al. |
| 2002/0092696 A1 | 7/2002 | Bohner et al. |
| 2002/0162700 A1 | 11/2002 | Moser et al. |
| 2002/0189888 A1 | 12/2002 | Magnus et al. |
| 2003/0127274 A1 | 7/2003 | Dominke et al. |

* cited by examiner

DRIVER INTERFACE SYSTEM FOR STEER-BY-WIRE SYSTEM

TECHNICAL FIELD OF THE INVENTION

This invention relates to a steer-by-wire system that includes a driver interface system comprising a steering wheel. More particularly, this relates to such system wherein the steering wheel is rotatable by an operator between limits that are dependent upon the ability of the road wheels to respond.

BACKGROUND OF THE INVENTION

In a conventional automotive vehicle, steering is accomplished by adjusting the orientation of the front road wheels. The road wheels pivot, either left or right, between stops that mechanically limit the orientation of the road wheels to assure operation within a safe turning radius. For example, the stops may be positioned to allow the wheels to turn within an angle of plus or minus 30° relative to a straight direction of travel. In a conventional steering system, the steering wheel is mechanically coupled to the road wheels through a rack and pinion mechanism wherein rotation of the steering wheel by the driver rotates a pinion to laterally displace a rack to change the orientation of the road wheels. When the road wheels engage a stop, the steering wheel is prevented from further rotation because of the mechanical coupling, thereby alerting the driver. Moreover, conditions may arise that prevent turning of the road wheels even though the mechanical stop has not been engaged, for example, when the road wheel engage a curb.

Steer-by-wire systems have been developed that include an electric motor that drives the pinion to displace the rack and change the road wheel orientation. U.S. Pat. No. 6,580,989, issued Jun. 17, 2003 to Husain et al., describes a steer-by-wire system that includes a rack and pinion mechanism operated by an electric motor. Steering commands are inputted by the operator using a steering wheel similar to mechanical steering systems. Electrical sensors detect rotation of the steering wheel and provide a signal to a controller that actuates the electric motor to reorient the road wheels.

In a mechanical steering system, the driver experiences a steering feel as a result of the mechanical linkage between the road wheels and the steering wheel. It is desired to provide the driver with a similar steering feel in steer-by-wire systems. For this purpose, it is proposed to couple the steering column to a reaction torque generator. A preferred reaction torque generator comprises an electric motor coupled to the steering column through a belt and pulley mechanism. In response to rotation of the steering wheel to input a steering command, the controller actuates the electric motor to apply an opposite torque to the steering column and thereby provide a feeling of resistance to the driver. The degree of resistance is determined by the controller based upon applicable steering parameters including vehicle speed, steering wheel angle, steering wheel turn rate, yaw rate, rack load, and lateral acceleration, and is intended to provide a feel similar to mechanical steering systems. The motor is sized to generate torque to produce the desired steering feel, but does not provide sufficient torque to lock the steering column, so is not able to alert the driver when the road wheels have engaged a stop or are otherwise prevented from turning.

It is known to equip a steering column with a mechanical stop that prevents endless spinning of the steering wheel, but is unrelated to the position of the road wheels. One advantage of steer-by-wire systems is that the steering ratio, by which is meant the angular displacement of the steering wheel divided by the directional change of the road wheels, may be varied depending upon driving conditions. That is, at low speeds, such as encountered during parking lot maneuvering, a low steering ratio is desired to provide a large directional change in the road wheels while minimizing the steering input. In contrast, at high speeds, a high steering ratio may be desired to provide a slight change in road wheel orientation in response to a turn of the steering wheel. Thus, in steer-by-wire systems, the angular displacement of the steering wheel when the stop is engaged may vary, and it is desired to alert the driver that the road wheel stop has been engaged that is not dependent upon a predetermined angular displacement of the steering wheel.

Therefore, there is a need for a driver interface subsystem that is capable of braking the steering wheel when the road wheels have engaged a stop or are unable of further directional change and thereby alerts the driver in a manner similar to mechanical system with which the driver is familiar.

SUMMARY OF THE INVENTION

In accordance with this invention, a steer-by-wire system is provided for an automotive vehicle that includes road wheels coupled to a rack. An electric motor is operatively coupled to the rack to laterally displace the rack and thereby alter road wheel orientation. The system further comprises a road wheel sensor for providing a signal to a controller to determine change in road wheel orientation in response to a steering command. In accordance with this invention, the system comprises a driver interface subsystem that includes a steering wheel mounted on a steering column and rotatable by a driver for inputting a steering command. The driver interface subsystem also includes a reaction torque generator and an electromechanical brake coupled to the steering column. During operation, the controller receives the signal from the sensor and determines whether the road wheel orientation corresponds to a limit, such as when the road wheels engage a mechanical stop mounted on the vehicle or are prevented from movement by a curb or other external impediment. The controller then actuates the electromechanical device to prevent rotation of the steering wheel. Thus, the driver is alerted based directly upon the responsiveness of the road wheels, in contrast to systems that apply an arbitrary end of travel limit to steering wheel rotation. Moreover, the end of travel brake for the steering wheel is accomplished independent from the operation of reaction torque generator, and thus allows the design of the reaction torque generator to be optimized to provide the desired steering feel.

BRIEF DESCRIPTION OF THE DRAWINGS

This invention will be further illustrated with reference to the accompanying drawings wherein.

DETAILED DESCRIPTION OF THE INVENTION

Figure 1:
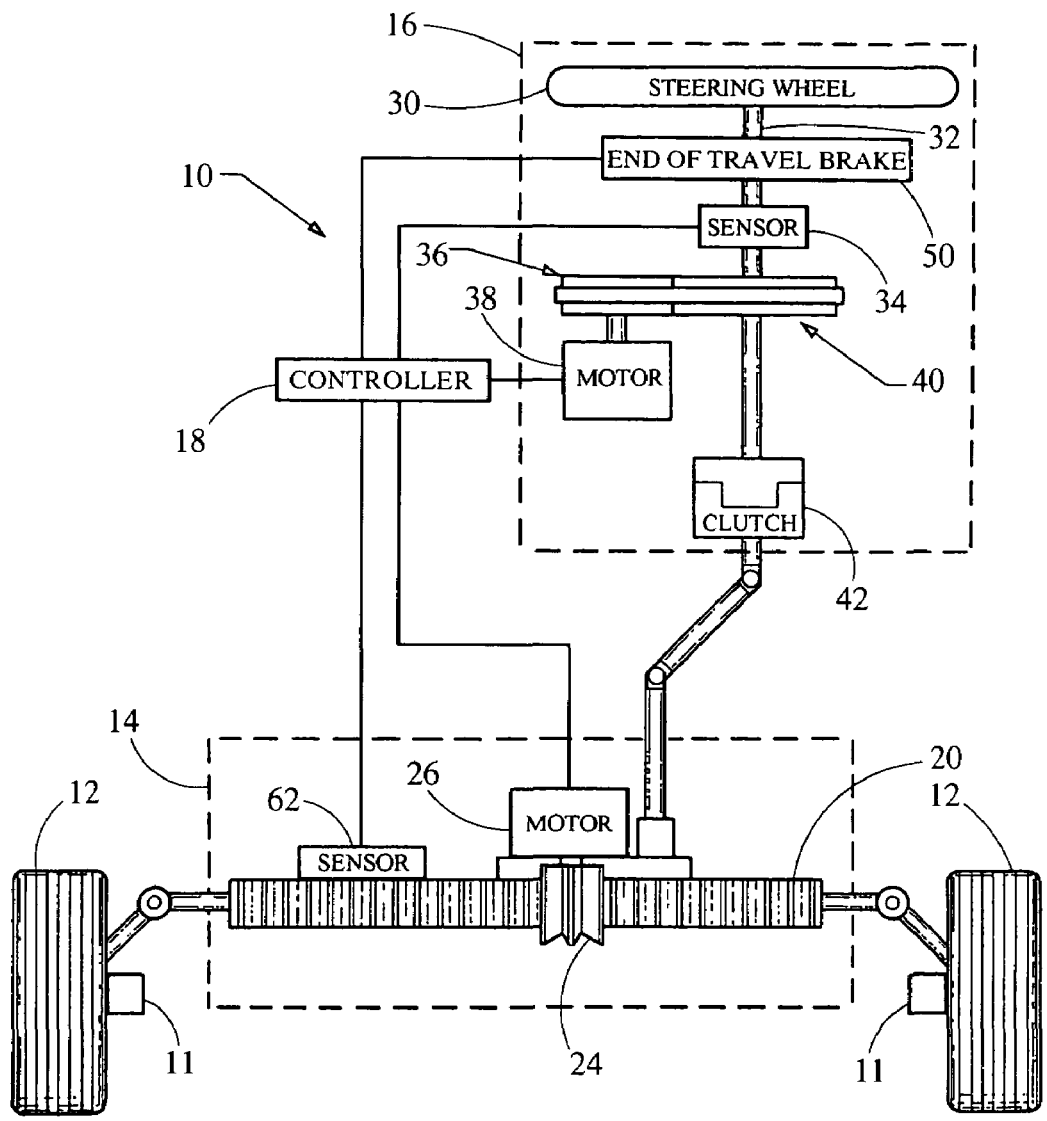
FIG. 1 is having a driver interface subsystem in accordance with this invention.

In accordance with the preferred embodiment of this invention, referring to FIG. 1, a steer-by-wire system 10 is provided for an automotive vehicle and adjusts the orientation of road wheels 12 to alter the direction of travel of the vehicle between limits that occur when road wheels 12 engage stops 11 mounted on the vehicle. Steer-by-wire system 10 comprises, as major components, a road wheel actuator subsystem 14, and a driver interface subsystem 16, linked to a computer controller 18.

Road wheel actuator subsystem 14 preferably comprises a rack 20 mechanically connected to road wheels 12 through linkages that alter the orientation of the road wheels in response to lateral displacement of the rack. Rack 20 comprises teeth that engage a pinion gear 24 that is driven by an electric motor 26. During operation, electric motor 26 is actuated in response to a signal from controller 18 and drives pinion 24, thereby laterally displacing rack 20.

Figure 2:
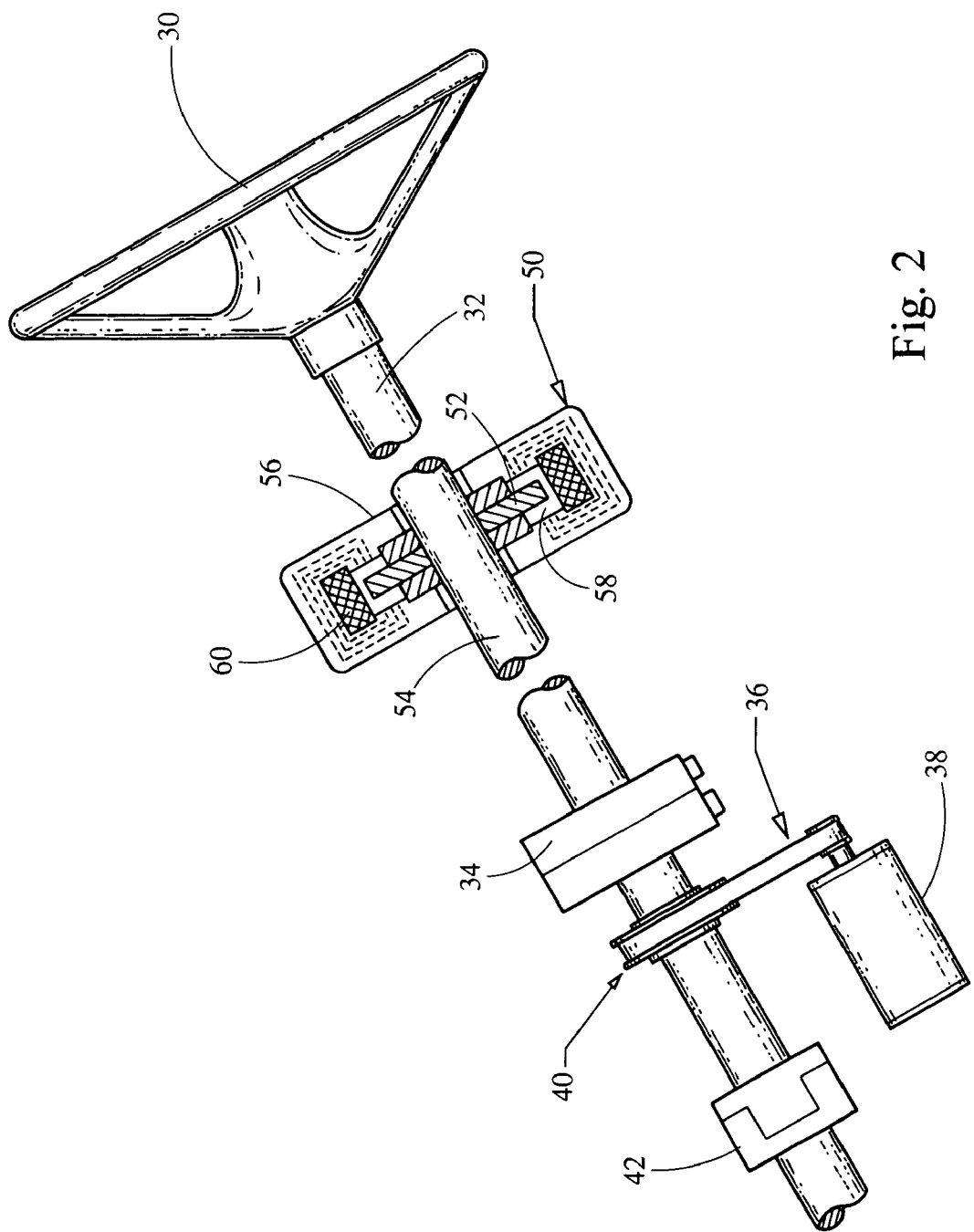
FIG. 2 is a schematic view showing a driver interface subsystem in accordance with a preferred embodiment of this invention.

Referring to FIGS. 1 and 2, driver interface subsystem 16 comprises a steering wheel 30 that is mounted on a steering column 32 and located within the passenger compartment of the vehicle. During operation, a driver rotates steering wheel 30 to input a steering command, in a manner similar to conventional automotive vehicles having mechanical steering systems. That is, typically, the operator rotates the steering wheel clockwise to steer the vehicle right and counterclockwise to steer the vehicle left. Sensors 34 detect rotation of column 32 and provide a suitable input signal to controller 18, which signal may include angular displacement or torque produced by the steering command.

Driver interface system 16 also includes a reaction torque generator 36 that comprises an electric motor 38 coupled to shaft 32 through a belt and pulley mechanism 40. Motor 38 is actuated by a signal from controller 18 to provide a resistive torque in response to rotation of steering wheel 30 and thereby provide the driver with a feel comparable to mechanical steering systems. In general, the magnitude and direction of the reaction torque will be determined as a function of plurality of parameters including vehicle speed, steering wheel angle, steering wheel rate, yaw rate, rack load and lateral acceleration. It is advantageous that reaction torque generator 36 is designed and operated solely to provide the desired feel and is not intended as a brake to prevent rotation of the steering column 32, but rather it is operated independently of the brake.

In the depicted embodiment, driver interface system 16 also includes an electromechanical clutch mechanism 42 that serves as a failsafe in the event that the steer-by-wire system is in some way disabled.

Further details regarding steer-by-wire system 10 including road wheel actuator 14 and driver interface subsystem 16 as described hereabove, and a method of operating same, is described in U.S. Pat. No. 6,580,989, issued Jun. 17, 2003, to Husain et al., which is incorporated by reference.

In accordance with this invention, driver interface subsystem 16 comprises an electromechanical end-of-travel brake 50 adapted to lock steering column 32 and prevent rotation of steering wheel 30. In a preferred embodiment, brake 50 is a magnetorheological device that comprises a rotor 52 mounted on a shaft 54 that forms part of steering column 32. Rotor 52 is enclosed in a housing 56 that contains a magnetorheological fluid 58. An electromagnetic coil 60 is also located in housing 56 about the perimeter of rotor 52 spaced apart by fluid 58. In the absence of electric current to electromagnetic coil 60, magnetorheological fluid 58 has a low viscosity that allows rotor 52 to rotate in response to a steering command. In contrast, when electrical current is applied to coil 60, the resulting electromagnetic field increases the viscosity of magnetorheological fluid 58 to prevent rotation of rotor 52, and thereby prevent rotation of column 32 and steering wheel 30. Thus, by application of electric current to coil 60, the electromechanical device acts as an effective brake to prevent rotation of the steering wheel. A suitable magnetorheological brake is commercially available from Lord Corporation, Cary, N.C., under the trade designation Rheonetic. Preferably, it is found that a device capable of locking the steering wheel against a force of at least 15 newton-meters torque provides a suitable end-of-travel alert.

During vehicle operation, controller 18 actuates brake 50 under selected circumstances to prevent rotation of steering wheel 30. For this purpose, controller 18 receives input from a sensor 62 operably coupled to rack 20. By way of an example, sensor 62 may comprise a pinion gear coupled to rack 20 so as to rotate in response to lateral movement of the rack, and a means for detecting rotation of the pinion gear. Alternately, the sensor may be suitably coupled to pinion gear 24 to detect rotation thereof.

In a preferred embodiment, controller 18 calculates the lateral displacement of rack 20 based upon the input from sensor 62 and actuates electromechanical brake 50 to alert the driver when controller 18 determines that road wheels 12 have engaged stops 11. This may occur when controller 18 determines that the rack has been displaced a sufficient distance to position the road wheels to engage the stops 11. Alternately, controller 18 may also actuate brake 50 to alert the driver when actuation of motor 26 fails to result in movement of rack 20, such as may occur when road wheels 12 engage a vehicle-mounted stop, a curb, or other obstacle. For this purpose, controller 18 may evaluate the signal from sensor 62 to determine relative movement of rack 20 and actuate brake 50 in response to a failure of rack 20 to move pursuant to a steering command. In a further embodiment, a sensor may suitably monitor the electrical current across motor 26 to detect a significant increase in the electrical load, indicative of a failure of the motor to actuate in response to a steering command, thereby indicating that the road wheels are stopped.

In the described embodiment, the brake is actuated to provide an end-of-travel stop to lock the steering wheel. The brake may also be suitably actuated during normal, non-stopped steering operations to augment the reaction torque provided by the reaction torque generator. Moreover, in the event of failure of the reaction torque generator, the brake may be actuated by the controller to provide a resistive torque to the driver that simulates a steering feel.

Therefore, this invention provides a driver interface system that includes a reactive torque generator and an electromechanical brake. It is an advantage that the reactive torque generator does not require an electric motor having a torque output sufficient to lock the steering column from rotation by the driver. Since the reaction torque required to provide steering feel to the driver is substantially less than that required to lock the steering wheel, this allows the size of the electric motor to be optimized, and the overall size of the driver interface module to be reduced. Nevertheless, the system responds to alert the driver upon engaging a road wheel stop, whereupon the controller independently actuates the brake to freeze the steering wheel. It is pointed out that, when the driver attempts to steer the vehicle in an opposite direction from the direction in which the stop is engaged, the electromechanical brake is readily released to free the steering wheel. Thus, the driver interface system of this invention not only provides optimum input to the driver regarding steering feel, but also alerts the driver as to steering limits. It is a further advantage of the driver interface system that the brake is activated based upon the actual movement of the road wheels, in marked contrast to arrangements that arbitrarily limit steering wheel travel independent of road wheel movement. Thus, the system can be operated with an optimum steering ratio and also provide a stop alert to the driver.

While this invention has been described in terms of certain embodiments thereof, it is not intended to be so limited, but rather only to the extent set forth in the claims that follow.

What is claimed is:

1. A steer-by-wire system for an automotive vehicle that includes road wheels, and a rack mechanically coupled to the road wheels and laterally displaceable to change a orientation of the road wheels, said steer-by-wire system comprising:

an electric motor coupled to the rack for laterally displacing the rack;
   a road wheel sensor providing a signal indicative of road wheel response to a steering command;
   a controller; and
   a driver interface subsystem comprising:
      a steering wheel mounted on a steering column and rotatable by a driver for inputting a steering command;
      a reaction torque generator coupled to the steering column for applying a resistive torque thereto in response to the steering command; and
      an electromechanical brake operatively coupled to the steering column and selectively actuatable to prevent rotation of the steering wheel,
      wherein the controller is coupled to the road wheel sensor for receiving the signal and for determining when the road wheel orientation has reached a limit based upon said signal, and coupled to the electromechanical brake for actuating said electromechanical brake in response thereto.

2. The steer-by-wire system of claim 1 wherein the limit corresponds to said road wheels engaging a stop mounted on the automotive vehicle.

3. The steer-by-wire system of claim 1 wherein the limit corresponds to a failure of the road wheels to change orientation in response to a steering command.

4. The steer-by-wire system of claim 1 wherein the electromechanical brake is a magnetorheological brake that includes a rotor that forms part of the steering column, and wherein the reaction torque generator comprises an electric motor coupled to the steering column through a belt and pulley mechanism.

5. The steer-by-wire system of claim 1 wherein the road wheel position sensor comprises means for detecting lateral displacement of the rack.

6. A steer-by-wire system for an automotive vehicle that includes road wheels, a rack mechanically coupled to the road wheels and laterally displaceable to alter the orientation of the road wheels, and stops disposed for engaging the wheels to limit the orientation thereof, said steer-by-wire system comprising:

an electric motor coupled to the rack for laterally displacing the rack;
   a road wheel position sensor providing a signal indicative of said road wheels engaging said stop;
   a controller; and
   a driver interface subsystem comprising:
      a steering wheel affixed to a steering column and rotatable by a driver for inputting a steering command;
      a reaction torque generator coupled to the steering column for applying a resistive torque thereto in response to a steering command; and
      a magnetorheological brake comprising a rotor operatively coupled to the steering column, an electrical coil applying an electromagnetic field about the rotor, and a magnetorheological fluid disposed about the rotor and responsive to an electromagnetic field applied by the electric coil to prevent rotation of the steering wheel, and
      wherein a controller is coupled to the road wheel position sensor for receiving the signal and for determining when the road wheels have engaged said stops, and is coupled to the magnetorheological brake for applying electrical current to said electrical coil to actuate said magnetorheological brake in response to said road wheels engaging said stop.

7. The steer-by-wire system of claim 6 wherein the reaction torque generator comprises an electrical motor coupled to the steering column through a belt and pulley mechanism.

8. The steer-by-wire system of claim 6 wherein the sensor comprises means for detecting lateral displacement of the rack.

9. The steer-by-wire system of claim 6 wherein the sensor comprises means for detecting increased electrical load to the electric motor.

10. A method for operating a steer-by-wire system for an automotive vehicle comprising road wheels and a rack operatively coupled to the road wheels and laterally displaceable to change a orientation of the road wheels, said steer-by-wire system comprising a steering wheel mounted on a steering column and rotatable by a driver for inputting a steering command, said method comprising:

actuating a reactive torque generator to apply a resistive torque in response to a steering command;
    providing an electromechanical brake operatively coupled to the steering column;
    determining the response of the road wheels to a steering command; and
    actuating the electromechanical brake in response to a determination that the road wheel orientation has reached a limit to prevent rotation of the steering wheel.

11. A method in accordance with claim 10 wherein the electromechanical brake is a magnetorheological device.

12. A method in accordance with claim 10 wherein the electromechanical brake is actuated independent of the resistive torque applied by the reactive torque generator.

13. A method in accordance with claim 10 wherein the limit corresponds to the road wheels engaging stop mounted on the automotive vehicle.

14. A method in accordance with claim 10 wherein the step of determining when the road orientation has reached a limit comprises sensing lateral displacement of the rack.

15. A method in accordance with claim 10 wherein the step of determining when the road wheel orientation has reached a limit comprises sensing an electrical load of an electric motor coupled to the rack.

16. A method in accordance with claim 10 further comprising actuating the electromechanical brake to provide resistive steering torque in the event of failure of the reactive torque generator.

* * * * *

UNITED STATES PATENT AND TRADEMARK OFFICE
CERTIFICATE OF CORRECTION

PATENT NO. : 6,899,196 B2
DATED : May 31, 2005
INVENTOR(S) : Muqtada Husain et al.

It is certified that error appears in the above-identified patent and that said Letters Patent is hereby corrected as shown below:

<u>Title page,</u>
Item [56], References Cited, U.S. PATENT DOCUMENTS,
delete "B.o slashed.rsting" and substitute -- Bϕrsting --.

Signed and Sealed this

Twenty-fifth Day of April, 2006

JON W. DUDAS
*Director of the United States Patent and Trademark Office*